US012437676B2

(12) United States Patent
Cook

(10) Patent No.: US 12,437,676 B2
(45) Date of Patent: Oct. 7, 2025

(54) PLANT LABEL AND TAG AND METHODS OF MAKING AND USING

(71) Applicant: Great Lakes Label, LLC, Comstock Park, MI (US)

(72) Inventor: John Anthony Cook, Comstock Park, MI (US)

(73) Assignee: Great Lakes Label, LLC, Comstock Park, MI (US)

( * ) Notice: Subject to any disclaimer, the term of this patent is extended or adjusted under 35 U.S.C. 154(b) by 0 days.

(21) Appl. No.: 18/530,707

(22) Filed: Dec. 6, 2023

(65) Prior Publication Data

US 2024/0420599 A1 Dec. 19, 2024

Related U.S. Application Data

(62) Division of application No. 17/287,672, filed as application No. PCT/US2019/058089 on Oct. 25, 2019, now Pat. No. 11,862,046.

(60) Provisional application No. 62/769,914, filed on Nov. 20, 2018, provisional application No. 62/750,850, filed on Oct. 26, 2018.

(51) Int. Cl.

*G09F 3/20* (2006.01)
*G09F 3/00* (2006.01)
*G09F 3/02* (2006.01)

(52) U.S. Cl.

CPC ............ *G09F 3/206* (2013.01); *G09F 3/0297* (2013.01); *G09F 2003/0239* (2013.01); *G09F 2003/0241* (2013.01)

(58) Field of Classification Search

CPC .................. G09F 3/206; G09F 3/0297; G09F 2003/0239; G09F 2003/0241

See application file for complete search history.

(56) References Cited

U.S. PATENT DOCUMENTS 4,551,373 A * 11/1985 Conlon ................ G09F 3/0292 283/105
5,284,363 A * 2/1994 Gartner .................... G09F 3/10 283/81
6,035,568 A * 3/2000 Grosskopf ............ G09F 3/0288 40/630
7,263,794 B2 * 9/2007 Gilbertie .................. G09F 3/04 40/606.19
7,438,224 B1 * 10/2008 Jensen ................ G06Q 20/347 235/487

(Continued)

OTHER PUBLICATIONS

International Search Report and Written Opinion corresponding to PCT/US2019/058089 mailed Feb. 7, 2020.

*Primary Examiner* — Gary C Hoge
(74) *Attorney, Agent, or Firm* — McGarry Bair PC

(57) ABSTRACT

A plant label has a substrate and a permanent adhesive layer on a release liner. An identifier portion of the substrate and a tag portion of the substrate are defined by a detach line that enables the tag portion to be detached from the identifier portion. The tag portion has an adhesive deadener on the permanent adhesive layer, a strip of the permanent adhesive layer of the detachable portion free of adhesive deadener, and a tab having only adhesive deadener on the permanent adhesive layer that enables the tag portion to be detached from the identifier portion and from a container to which the label is affixed.

16 Claims, 16 Drawing Sheets

(56) References Cited

U.S. PATENT DOCUMENTS

| | | | | |
|---|---|---|---|---|
| 2003/0012913 | A1* | 1/2003 | Seidl | G09F 3/0288<br>428/42.2 |
| 2004/0129377 | A1* | 7/2004 | Felder | G09F 3/10<br>156/247 |
| 2008/0032081 | A1* | 2/2008 | Gelsinger | B31D 1/021<br>428/40.1 |
| 2015/0086744 | A1* | 3/2015 | Avis | G09F 3/0288<br>428/43 |
| 2017/0282532 | A1* | 10/2017 | Seymour | B32B 38/10 |
| 2018/0253995 | A1* | 9/2018 | Amend | H04N 1/0066 |
| 2024/0194094 | A1* | 6/2024 | Hong | G09F 3/206 |

* cited by examiner

PLANT LABEL AND TAG AND METHODS OF MAKING AND USING

CROSS REFERENCE TO RELATED APPLICATIONS

This application claims priority and benefit of U.S. application Ser. No. 17/287,672, filed Apr. 22, 2021, now U.S. Pat. No. 11,862,046, issued Jan. 2, 2024, which claims the benefit of International Application No. PCT/US2019/058089, filed Oct. 25, 2019, which claims the benefit of U.S. Application Ser. No. 62/750,850 filed Oct. 26, 2018, and U.S. Application Ser. No. 62/769,914 filed Nov. 20, 2018, the entireties of which are all incorporated herein.

BACKGROUND

Horticultural plants sold at retail often have a label affixed to containers (pots) holding the plants in soil. The label typically carries an identification of the plant and a bar code, and is affixed to the container so as to not be removable. It is known to affix labels to containers adhesively or in some cases to simply print labels on the containers. In addition, each plant is also accompanied by a tag, either set in the soil or attached to the plant or to the container and designed to be removable. Tags are commonly made of plastic and have a pointed end to more easily insert into soil, or in some cases have an arrow head to be received in a slot in the container. The tag typically carries information related to the care and growth of the plant. Once removed, a user can place the tag anywhere the user desires, including safe storage after planting to identify the plant and reference care instructions for the plant.

Printing and installing labels and tags is labor-intensive. Labels are often affixed and tags placed manually, sometimes requiring 6-10 people per production line. One known solution to reduce the high labor costs is to place all of the information on a label and have no tag for a leave behind in the soil or safe storage. However, this solution has not been generally accepted by many retailers. It is used mostly for limited product lines on where the plant is in full bloom when purchased.

BRIEF SUMMARY

An aspect of the present disclosure relates to a method of making a label for a growing plant. The method includes providing a sheet having a substrate layer, a permanent adhesive layer on the substrate layer, and a release liner on the permanent adhesive layer. The release liner is delaminated from the permanent adhesive layer, and an adhesive deadener is applied to a predetermined portion of the permanent adhesive layer. The release liner is relaminated to the permanent adhesive layer. Only the substrate layer is cut to define a label and the label is scored within the cutting to define an identifier portion and a tag portion. The predetermined portion is entirely within the tag portion, and the tag portion includes a tab with adhesive deadener between the permanent adhesive layer and the release liner such that the identifier portion is fixable to a plant container and the tag portion is detachable from the identifier portion at the scoring and from the plant container by way of the tab.

Another aspect of the present disclosure relates to a growing plant label having a substrate with a first surface and an opposed second surface. A pressure sensitive adhesive layer is on the second surface. A fixable portion of the substrate and a detachable portion of the substrate are defined by a score line that enables the detachable portion to be detached from the fixable portion. An adhesive deadener is on the pressure sensitive adhesive layer of the detachable portion wherein a strip of the pressure sensitive adhesive layer of the detachable portion is free of adhesive deadener. The detachable portion includes a tab having only adhesive deadener on the pressure sensitive adhesive layer.

DETAILED DESCRIPTION

Figure 1A:
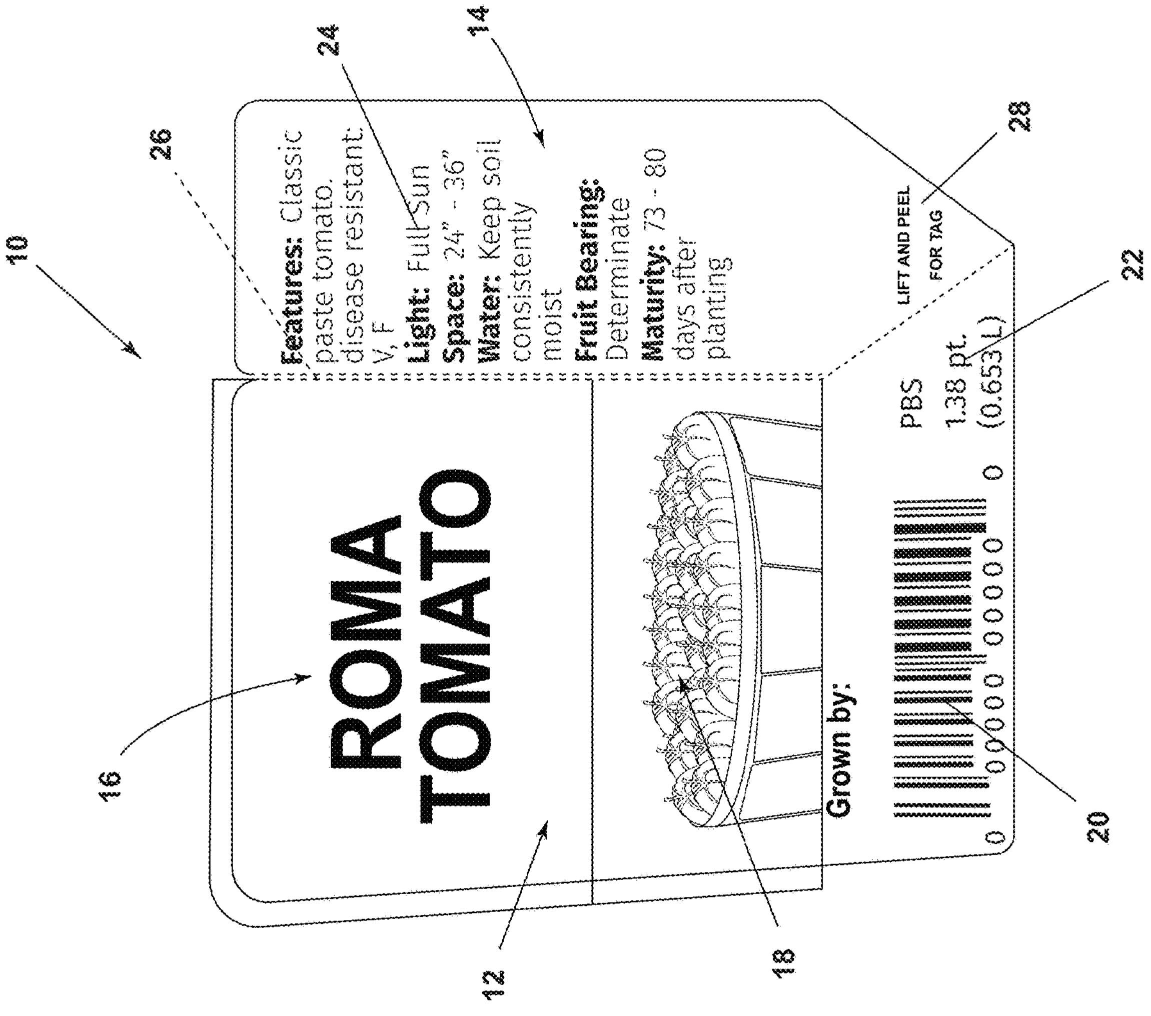
FIG. 1A is a plan view of a horticultural plant label according to aspects of the invention, having a tag portion on a right side of an identifier portion.

Aspects of the present disclosure relate to labels for growing plants and methods of making and using them. Although the illustrated embodiments are primarily horticultural, the labels and methods disclosed herein will find applicability anywhere growing plants are used or sold, including both horticultural and agricultural uses. It will be apparent that a combined fixable identifier portion and a detachable tag portion will reduce time, inventory, and costs in application to plant containers, reduce waste, and aid end users in growing and managing plants. Printing and applying the labels herein described can be particularly effected in a one-step process using a machine sold under the Label Gator brand by Great Lakes Label, Inc.

Looking first to FIGS. 1A-1F, several varieties of labels 10 are shown. In each embodiment, the label comprises a fixable portion 12 and a detachable portion 14. The fixable portion 12 is fixable in the sense that it is configured to be affixed permanently to a plant container or pot. The fixable portion 12 will typically have identifier information related to the plant growing in the pot to which it is affixed, including among other things, at least one of a name 16 of the plant, a photo 18 of the plant, and/or a bar code 20 for tracking the potted plant through sale to an end user. The fixable or identifier portion 12 may also include other information 22 related to the grower or source of the plant, the retail seller, and size of the container or the plant.

The detachable or tag portion 14 will typically have growing information 24 related to the care and growing of the plant in the container. Such plant information 24 typically includes data about planting depth, spacing, watering, feeding, light requirements, appropriate temperatures zones, harvesting, and the like. The identifier portion 12 and the tag portion 14 will be separable from each other along a detach line 26. The location of the detach line 26 will vary depending the shapes and relative positioning of the identifier portion 12 and the tag portion 14.

Figure 1B:
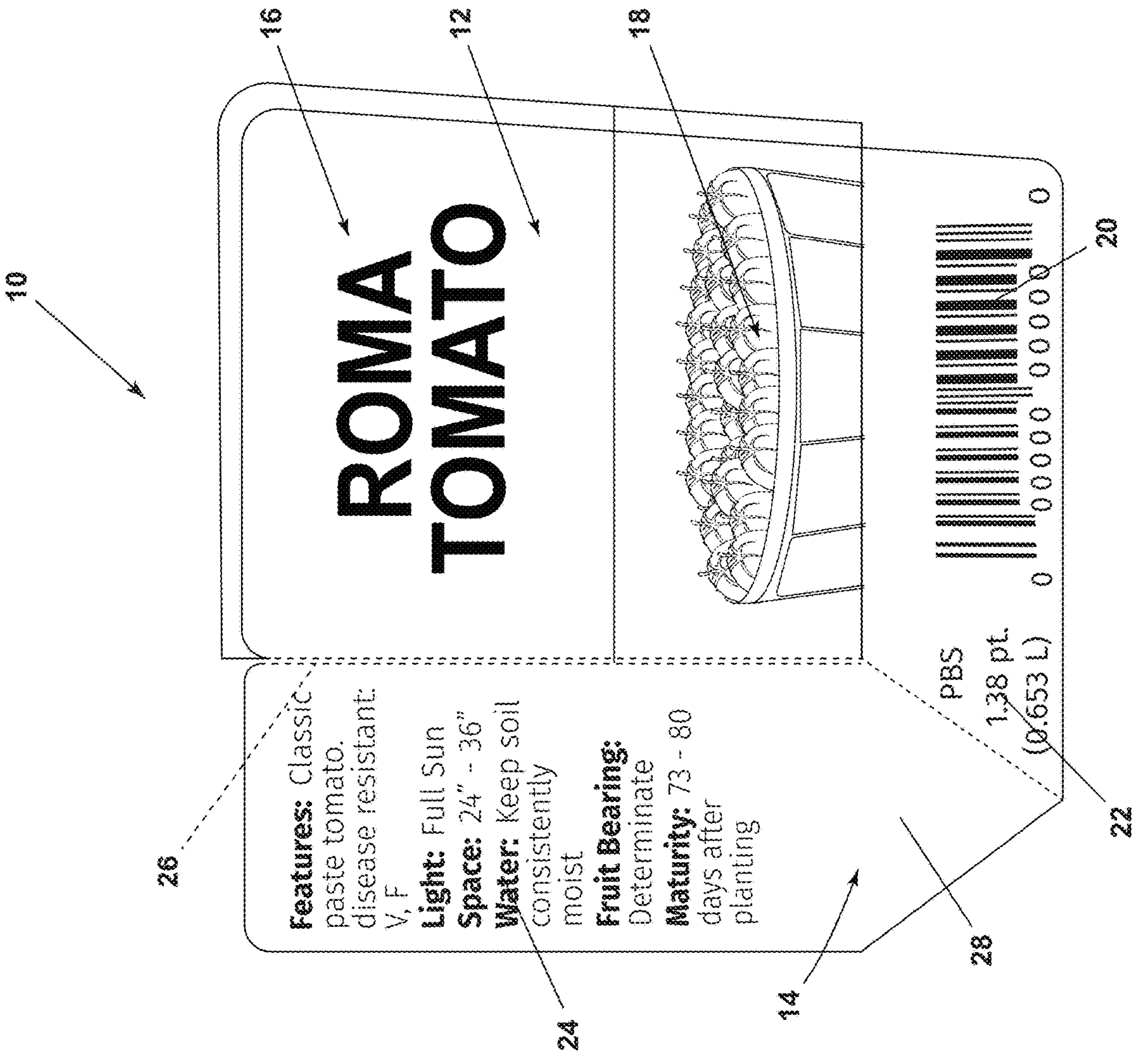
FIG. 1B is a plan view of a horticultural plant label according to aspects of the invention, having a tag portion on a left side of an identifier portion.
Figure 1C:
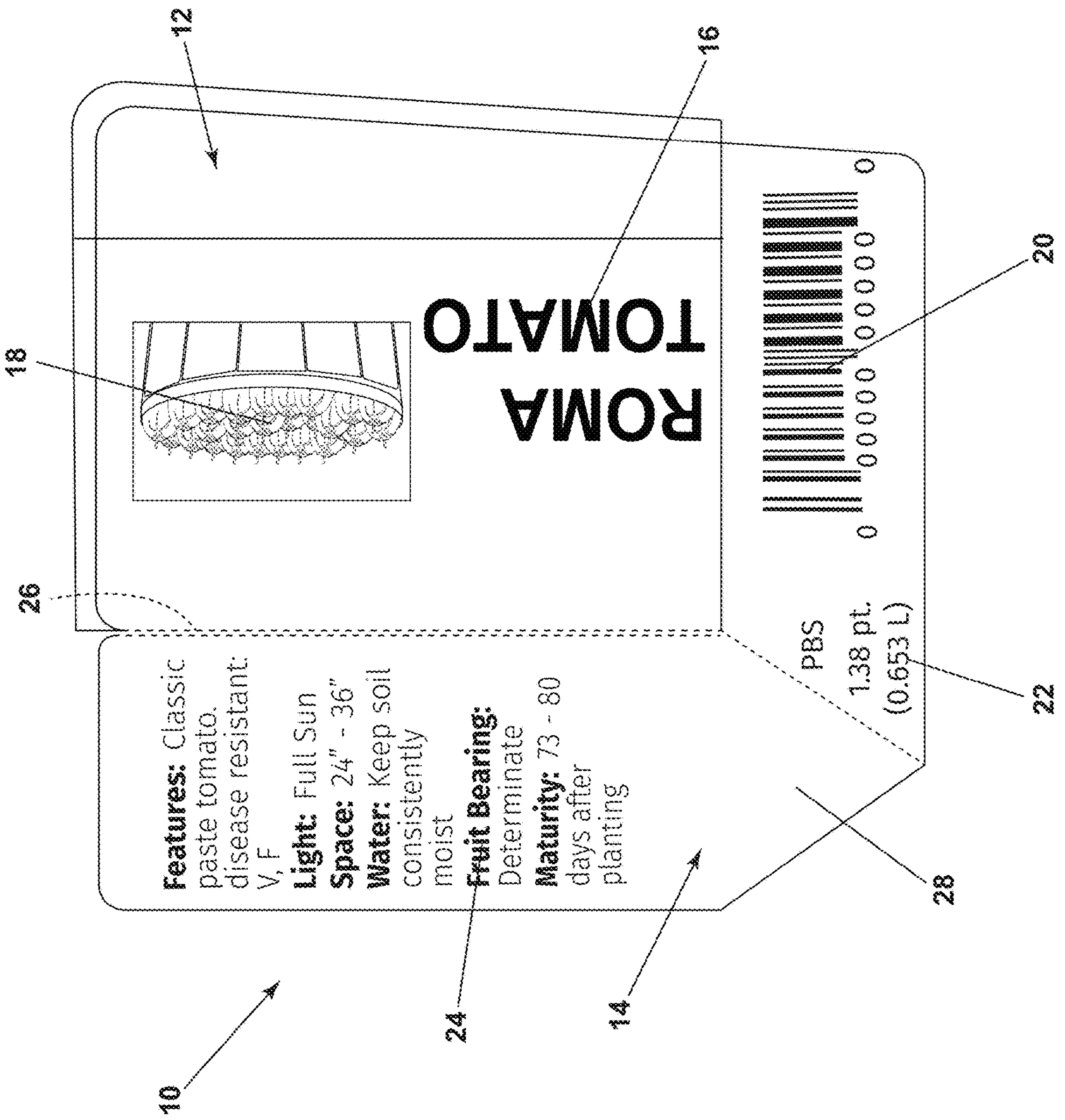
FIG. 1C is a plan view of a horticultural plant label according to aspects of the invention, having a tag portion on a top side of an identifier portion.
Figure 1D:
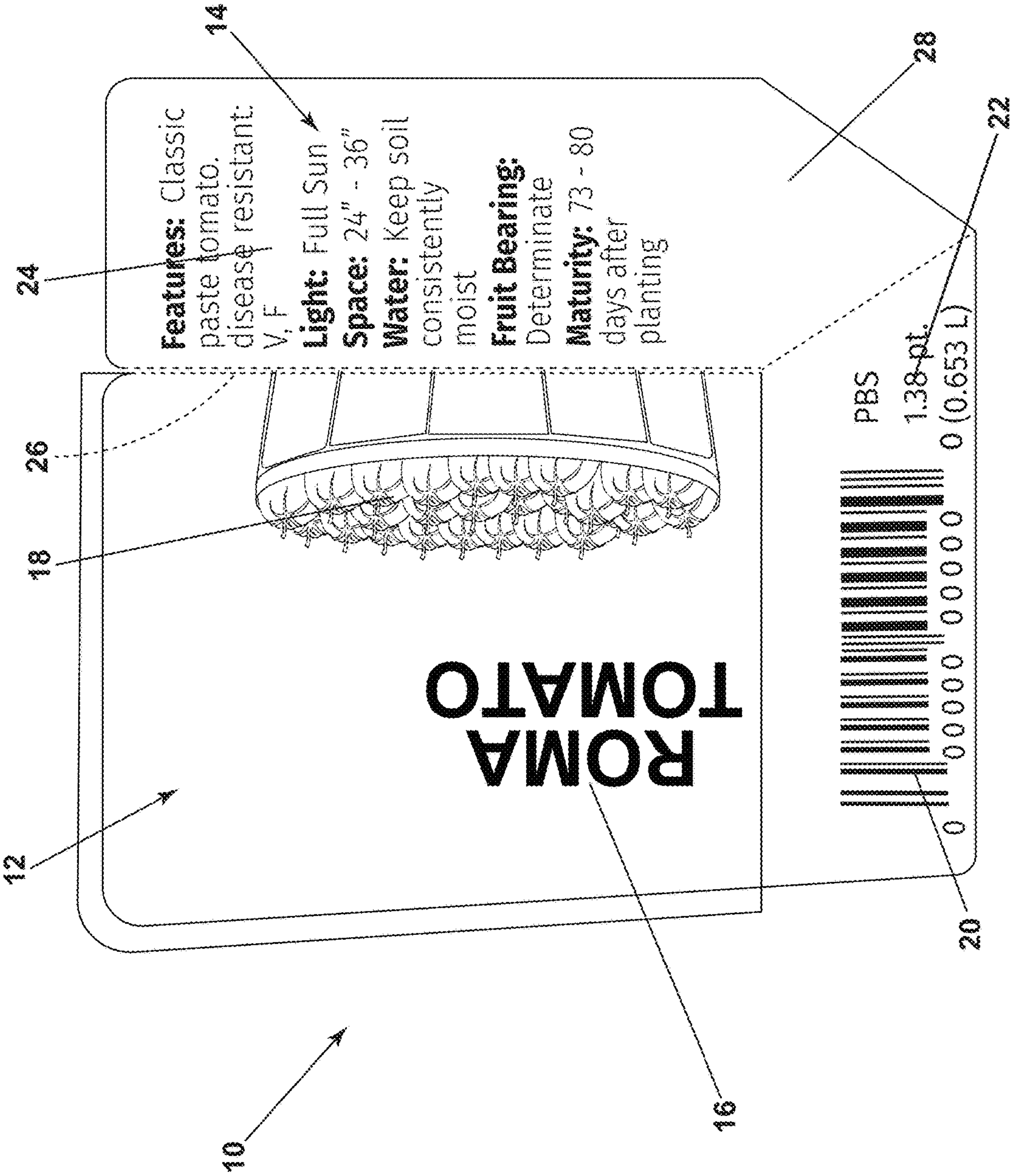
FIG. 1D is a plan view of a horticultural plant label according to aspects of the invention, having a tag portion on a bottom side of an identifier portion.
Figure 1E:
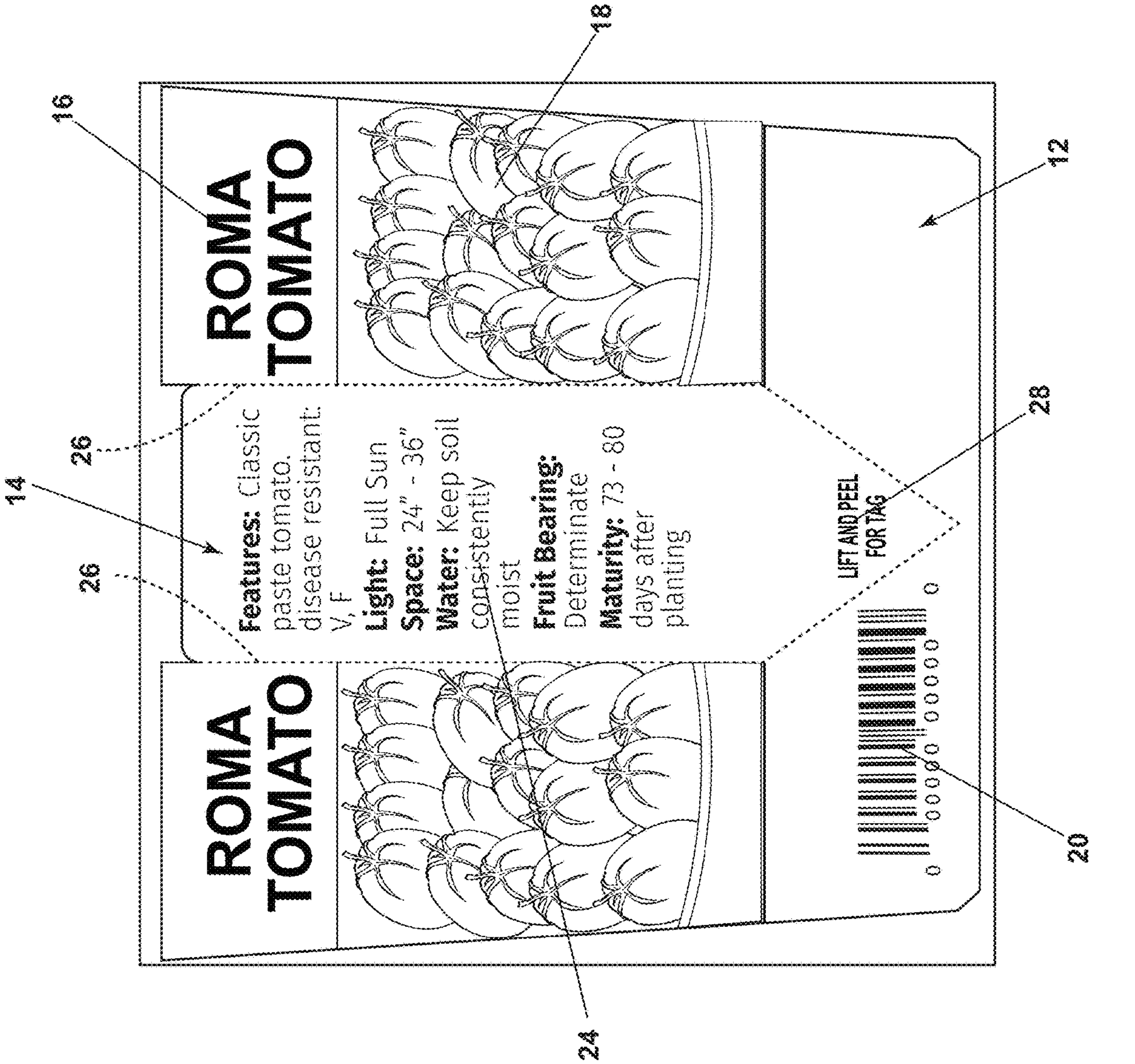
FIG. 1E is a plan view of a horticultural plant label according to aspects of the invention, having a tag portion between right and left identifier portions.
Figure 1F:
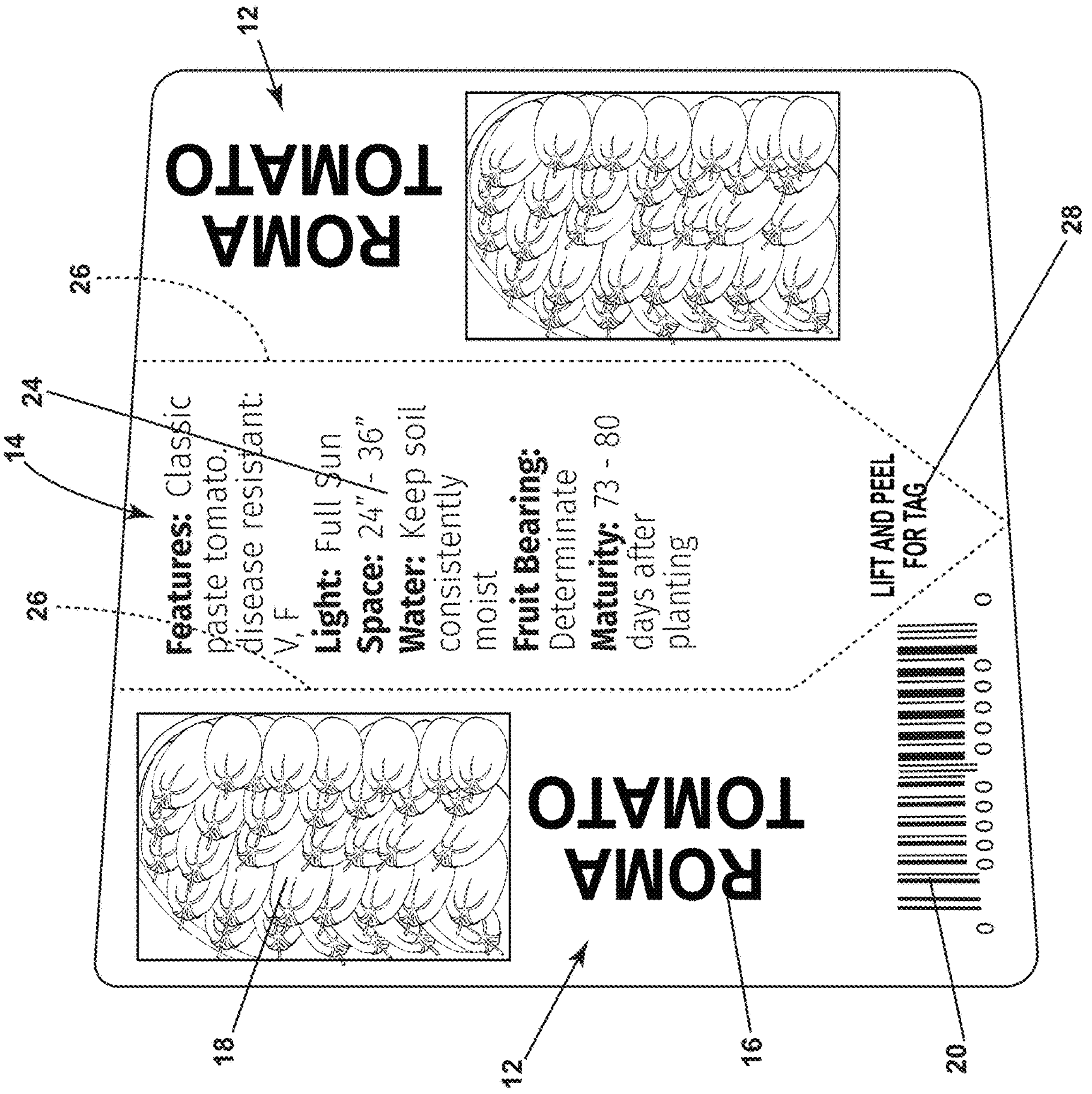
FIG. 1F is a plan view of a horticultural plant label according to aspects of the invention, having a tag portion between top and bottom identifier portions.

Various relative positions can be seen in FIGS. 1A-1F. In FIG. 1A, the identifier portion 12 is to the left and the tag portion 14 is to the right. In FIG. 1B, the identifier portion 12 is to the right and the tag portion 14 is to the left. In FIG. 1C, the identifier portion 12 is to the bottom and the tag portion 14 is to the top. In FIG. 1D, the identifier portion 12 is to the top and the tag portion 14 is to the bottom. In FIG. 1E, the identifier portion 12 is to the right and left and the tag portion 14 is between the right and left sides of the identifier portion 12. In FIG. IF, the identifier portion 12 is to the top and bottom and the tag portion 14 is between the top and bottom sides of the identifier portion 12. It will be understood than any arrangement of the relative positions of the identifier portion 12 and the tag portion 14 is within the scope of this disclosure so long as the identifier portion 12 and the tag portion 14 are connected but separable from each other.

The shapes of the identifier portion 12 and the tag portion 14 are likewise not limited to those disclosed herein. It is anticipated that a common shape for the identifier portion 12 will generally be a quadrilateral, and that a common shape for the tag portion 14 will be a rectangle with a wedge-shaped tab 28 at one end, as shown also in FIG. 4.

Figure 2:
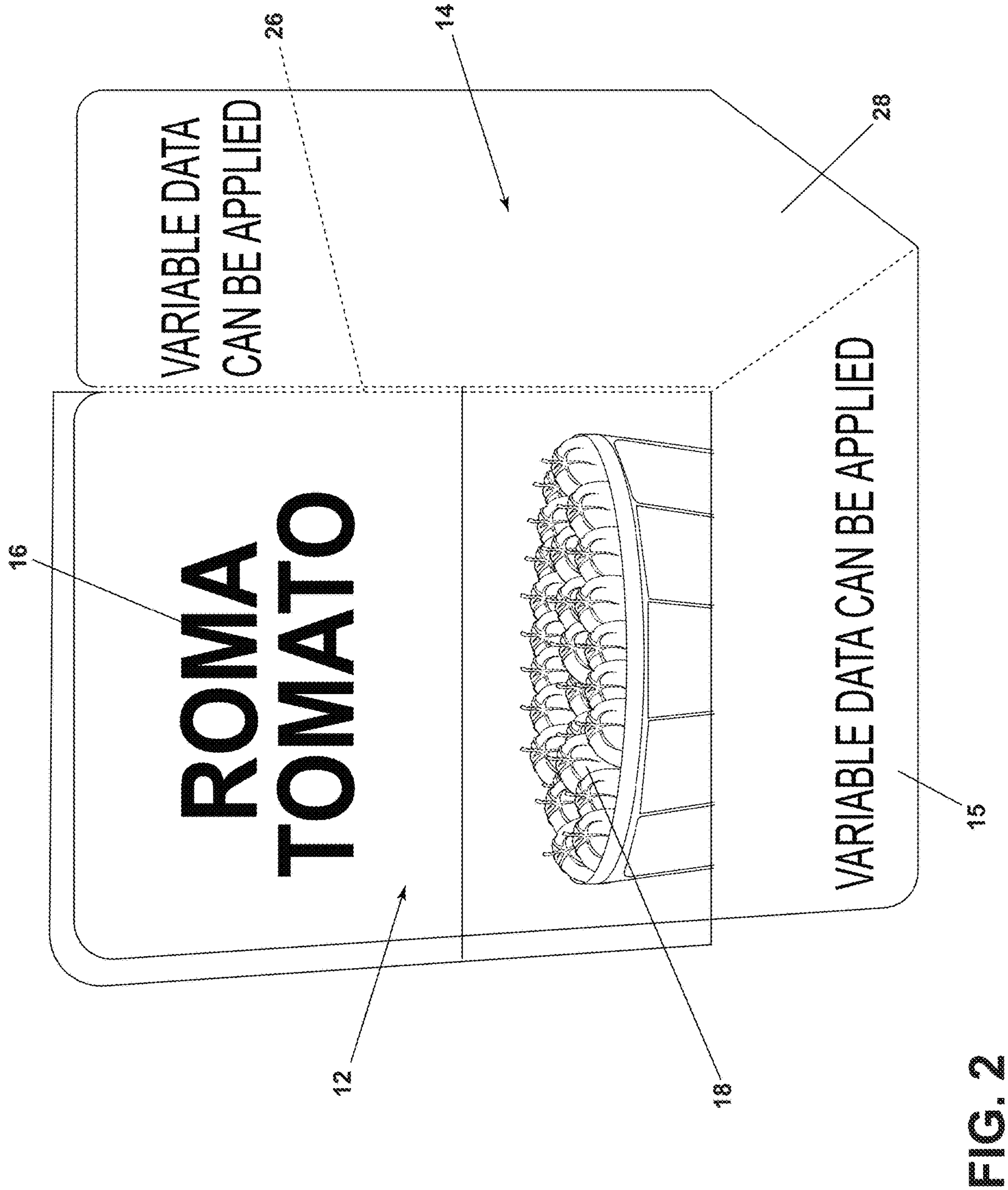
FIG. 2 is a plan view of a horticultural plant label similar to FIG. 1A according to aspects of the invention, but with blank area on the identifier and tag portions for later printing.

Any portion of the label 10 can be partially printed as, for example in FIG. 2, or the label 10 can be made without printing, for later printing nu an end user or intermediary. If partially printed as in FIG. 2, indicia may be printed, for example, on all or part of the fixable portion 12, leaving an unprinted portion 15 thereof, and leaving the tag portion 14 unprinted. It will be understood that either both the fixable portion of the tag portion or both may be fully printed, or partially printed or completely unprinted at the time of manufacture.

Figure 3:
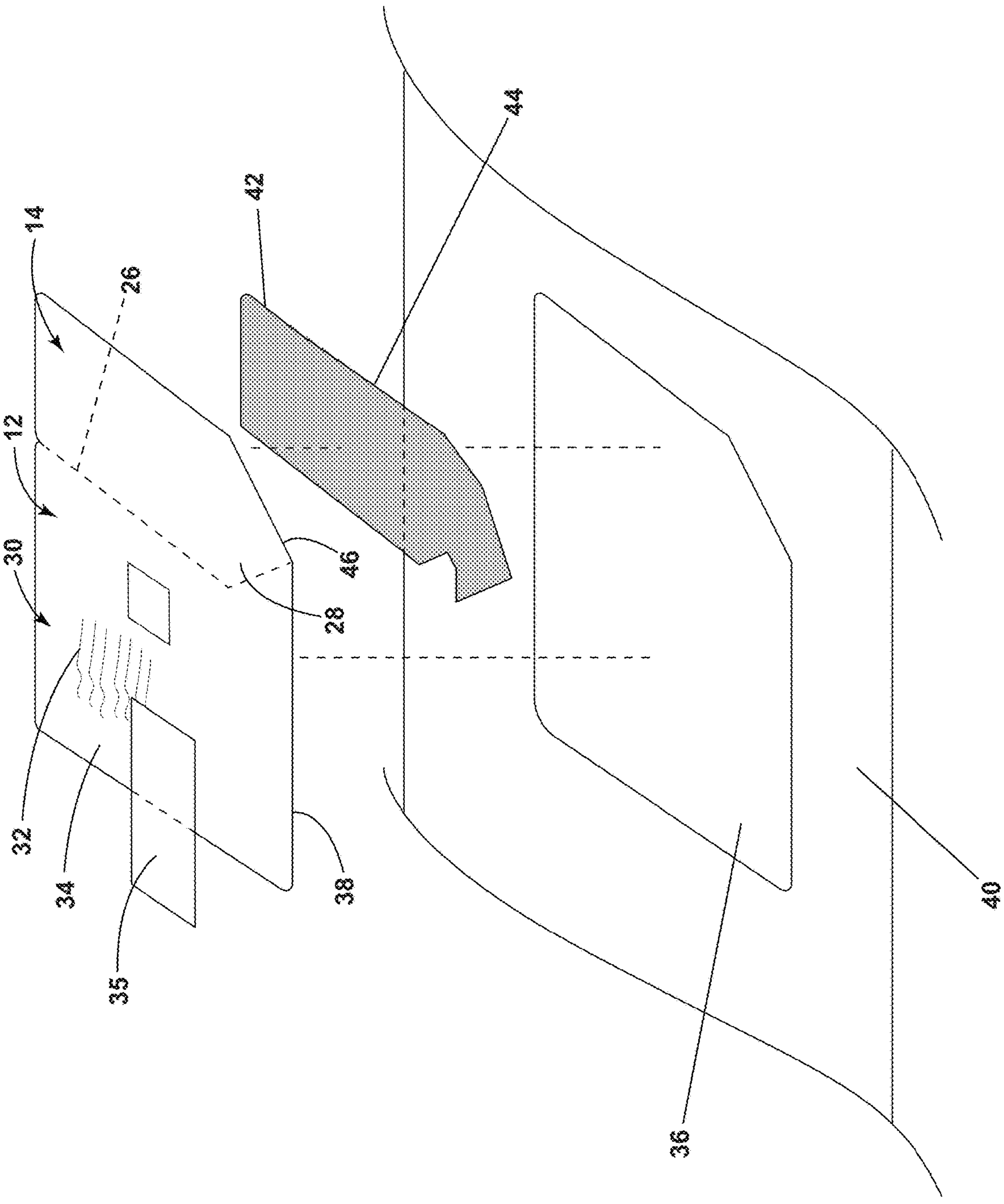
FIG. 3 is an exploded view of the horticultural plant label of FIG. 1A, showing layers thereof.

Looking now at FIG. 3, one can see an exemplary layered structure of the label 10. A principal layer includes a substrate 30 which will most commonly be a plastic such as polypropylene or a paper, such as Polyart. The substrate may have a thickness in a range of about 4-12 mills, preferably about 10 mills. Indicia 32 can be printed on an upper surface 34 of the substrate 30, and in some cases a protective layer 35 such as a thermal transfer varnish may be applied to all or part of the upper surface 34 either before or after printing the indicia 32. A layer of permanent adhesive 36 is disposed on a lower surface 38 of the substrate, preferably covering the entire lower surface 38. The permanent adhesive layer 36 may comprise an acrylic or a rubber depending on the material of the container to which the label 10 is to be attached, and will preferably be pressure sensitive, i.e., able to adhere the substrate layer 30 to a surface by pressing the substrate 30 (and the adhesive layer 36) to the surface. The adhesive layer 36 will typically be in a range of about 0.75-2 mills thick. A release liner 40 covers the permanent adhesive layer 36 to enable the label 10 to be handled and transported without interference from the adhesive 36. It is contemplated that the release liner 40 can be in the form of a web sheet on which an array of multiple labels 10 can be disposed, or in the form of a roll on which an array of labels 10 can be linearly disposed, or in a form contiguous with the shape of the label 10 for individual handling.

Figure 4:
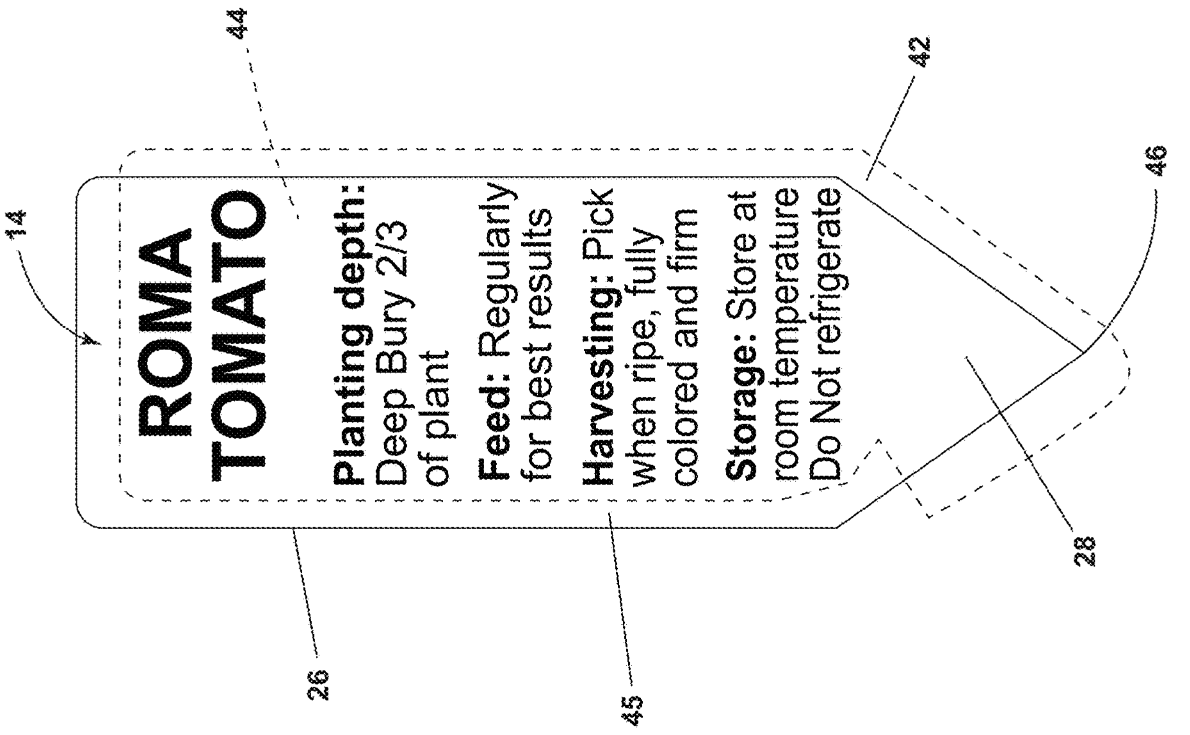
FIG. 4 is a plan view of a tag portion of the horticultural plant label of FIG. 1A detached from the label portion.

An adhesive deadener 42 is applied to the adhesive layer 36 at a predetermined portion 44 of the label 10, preferably at the tag portion 14. The adhesive deadener 42 may be any compound or coating or process that effectively neutralizes the adhesive layer 36 at the predetermined portion 44. Preferably, the adhesive deadener 42 will be a coating that enables printing of indicia 32 on the lower surface 38 of the substrate 30 or on the adhesive deadener 42 itself. As shown in FIG. 4, the predetermined portion 44 will cover all or most of the tag portion 14 so it will be free from a container to which the label 30 is adhered, preferably leaving a small strip 45 of permanent adhesive 36 undeadened adjacent the detach line 26 so it can lightly adhere to a container. It is anticipated that at least the tip 46 of the tab 28 will have a full deadener 42 so it will not adhere to a container.

The detach line 26 can be any structure that permits the tag portion 14 to be separated or detached from the identifier portion 12. For example, the detach line 26 may be scored or perforated or slotted. As well, the tab 28 may be disconnected completely from the identifier portion 12 to enable easier grasping of the tab 28 to aid in detaching the tag portion 14 from the identifier portion 12. Hence, all or portion of the detach line 26 may connect the tag portion 14 to the identifier portion 12.

A method [[100]] of making the label 10, and more particularly, a method of making a sheet of labels 10, is schematically described. The method [[100]] commences at a first step [[102]] with providing a sheet comprising the substrate layer 30, the permanent adhesive layer 36, and the release liner 40. The sheet may be in a form of a roll. At a second step [[104]], the release liner 40 is delaminated from the adhesive layer 36, preferably as the roll is unwound. When the adhesive layer becomes exposed, the adhesive deadener 42 is applied to the predetermined portion 44 at a third step [[106]]. At this point in the method, several optional steps are available. At an optional fourth step [[108]], indicia 32 can be printed on the lower surface 38 of the substrate 30 and/or on the adhesive deadener 42 at the tag portion 14. Recall that the tag portion 14 is removable from the label 10 and it may be desirable to have indicia on both sides of the tag portion 14 for viewing after removal. At a fifth step [[110]], indicia 32 can be printed on the upper surface 34 of the substrate 30, either on the identifier portion 12 or the tag portion 14 or on both the identifier portion 12 and the tag portion 14. It will be understood that printing can occur at one or more stations, in one step or multiple steps, in one color or multiple colors, as needed. In the embodiments illustrated herein, one can see that color indicia 32, including a graphic of a plant referred to in the label 10, is printed on the upper surface 34 of the substrate 30 at the identifier portion 12, indicia 32 in black is printed on the upper surface 34 of the substrate 30 at the tag portion 14, and indicia 32 in black is printed on the lower surface 38 of the substrate 30 at the tag portion 14. It is further contemplated by the line from the fifth step [[110]] to a sixth step [[112]], that one option is for no printing to occur. At the sixth step [[112]], the release liner 40 is relaminated to the adhesive layer 36. The release liner 40 will not adhere to the predetermined portions 44 where adhesive deadener 42 is applied, but there will be adequate exposed adhesive to enable relamination. It will be understood that the relamination sixth step [[112]] can occur after or coincident with any one or more of the printing steps, such as the fourth step or the fifth step, and it may occur before the printing step, such as before the fifth step [[110]].

At a seventh step [[114]], the protective layer 35 is optionally applied to the upper surface 34 of the substrate 30. The protective layer 35 may a separate sheet or film, or a spray coating, and may be in the form of a thermal transfer varnish that enables all or a portion of the printing step, such as the fourth step [[108]] after applying the protective layer 35 in the seventh step [[114]].

At an eighth step [[116]], the substrate layer 30 is cut to define each label 10, including the combined identifier portion 12 and tag portion 14 of each label 10, on the sheet. The cutting may occur by a rotary die as the sheet is passed through the die, where a cutting edge of the die slices the substrate 30 and preferably the adhesive layer 36, but not the release liner 40. Alternatively, the cutting may occur by a stamping die that sequentially stamps the substrate 30 but not the release liner 40 to cut one or more labels 10 on the sheet. At a nineth step [[118]], the substrate layer 30 is scored at the detach line 26 so the tag portion 14 remains attached to the identifier portion 12. Steps, such as the eighth step and the nineth step may be combined into a single operation, as for example, where a rotary die includes both a cutting edge and a scoring edge. After cutting at the eighth step and/or the nineth step [[118]], the release liner 40 carrying the cut labels 10 may be rerolled for later use as desired.

At a tenth step [[120]], the labels 10 are removed from the release liner 40 for application to containers. Alternatively, the matrix of substrate 30 surrounding each label 10 on the sheet can be removed from the release liner 40, leaving only each label 10 on the sheet of the release liner 40. At this point, the release liner 40 carrying the labels 40 can also be rerolled for storage or transport. Removal of the labels 10 from the release liner 40 (or removal of the matrix from the release liner 40) in the tenth step [[120]] can occur simultaneously with application of the labels 10 to containers. For example, in automated operation, the sheet can be fed to a line of containers where each label 10 is detached from the release liner and applied to a container as each container in the line passes the sheet sequentially, whereupon the release liner 40 and the matrix of substrate 30 left behind by removal of the labels 10 is disposed as waste. As well, each label 10 can be removed manually from the sheet and applied manually to a container.

Figure 5A:
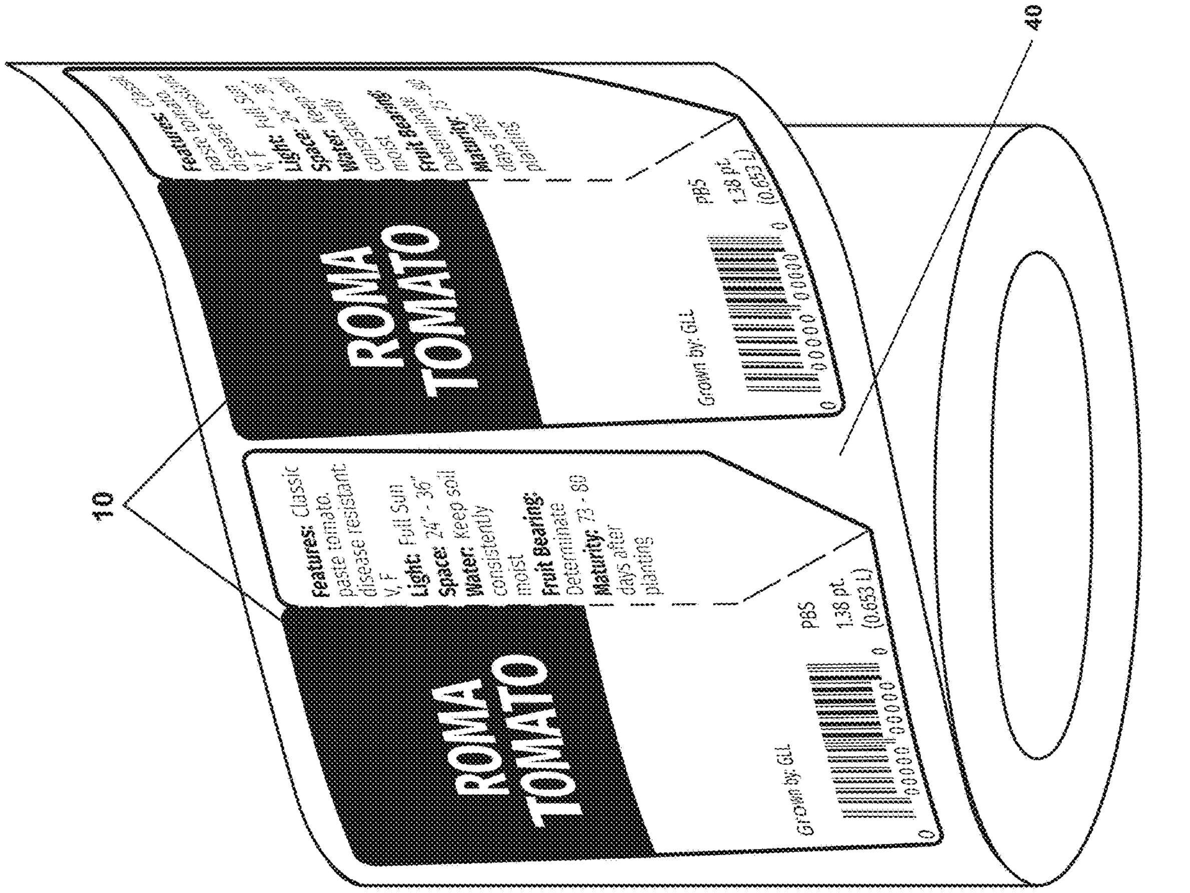
FIG. 5A is an example of a roll of fully preprinted horticultural plant labels made according to aspects of the invention.
Figure 5B:
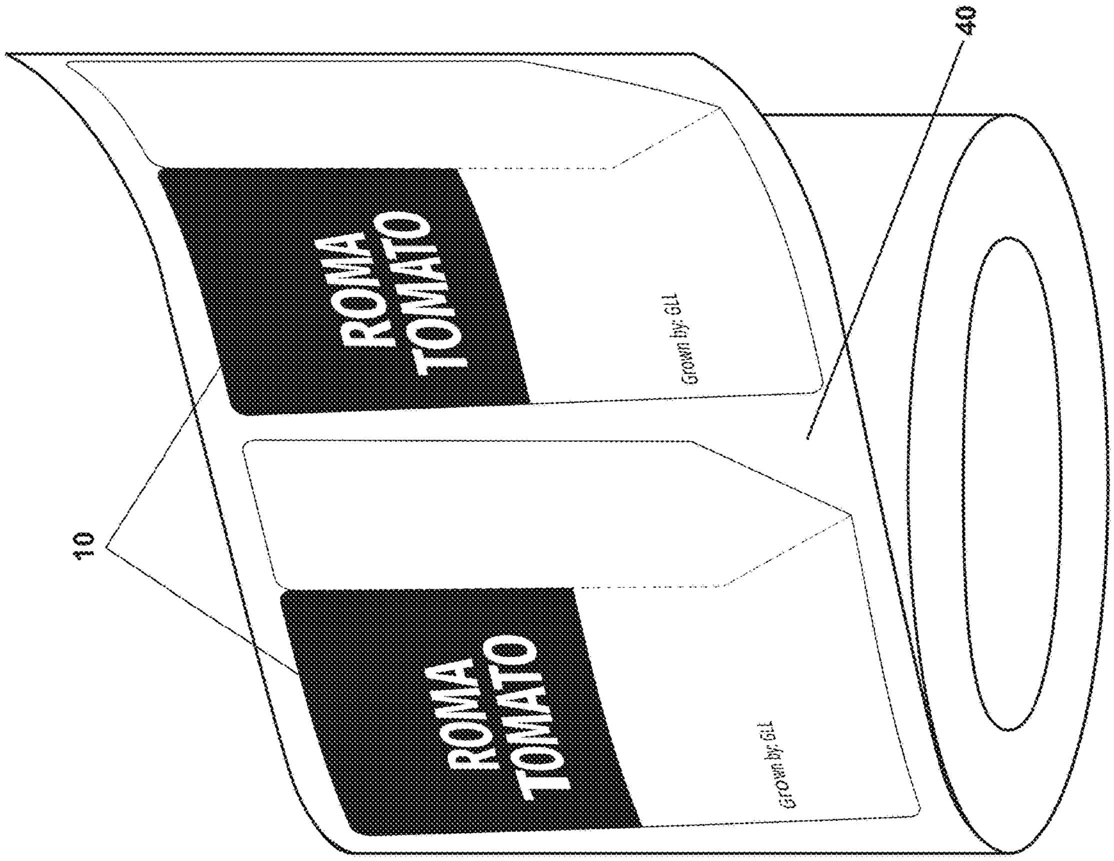
FIG. 5B is an example of a roll of partially preprinted horticultural plant labels made according to aspects of the invention.

FIG. 5A illustrates a roll of labels 10 on a sheet after the nineth step [[118]] where the labels are fully printed at the fourth step and/or the fifth step [[110]], and the release liner 40 carrying the cut labels 10 has been rerolled for later use, such as for example, in the tenth step [[120]]. FIG. 5B illustrates a roll of labels 10 on a sheet after the nineth step [[118]] where the labels are partially printed in the fourth step and/or the fifth step [[110]], and the release liner 40 carrying the cut labels 10 has been rerolled for later use, such as further printing in the fourth step and/or the fifth step [[110]], and/or removing in the tenth step [[120]].

Figure 6:
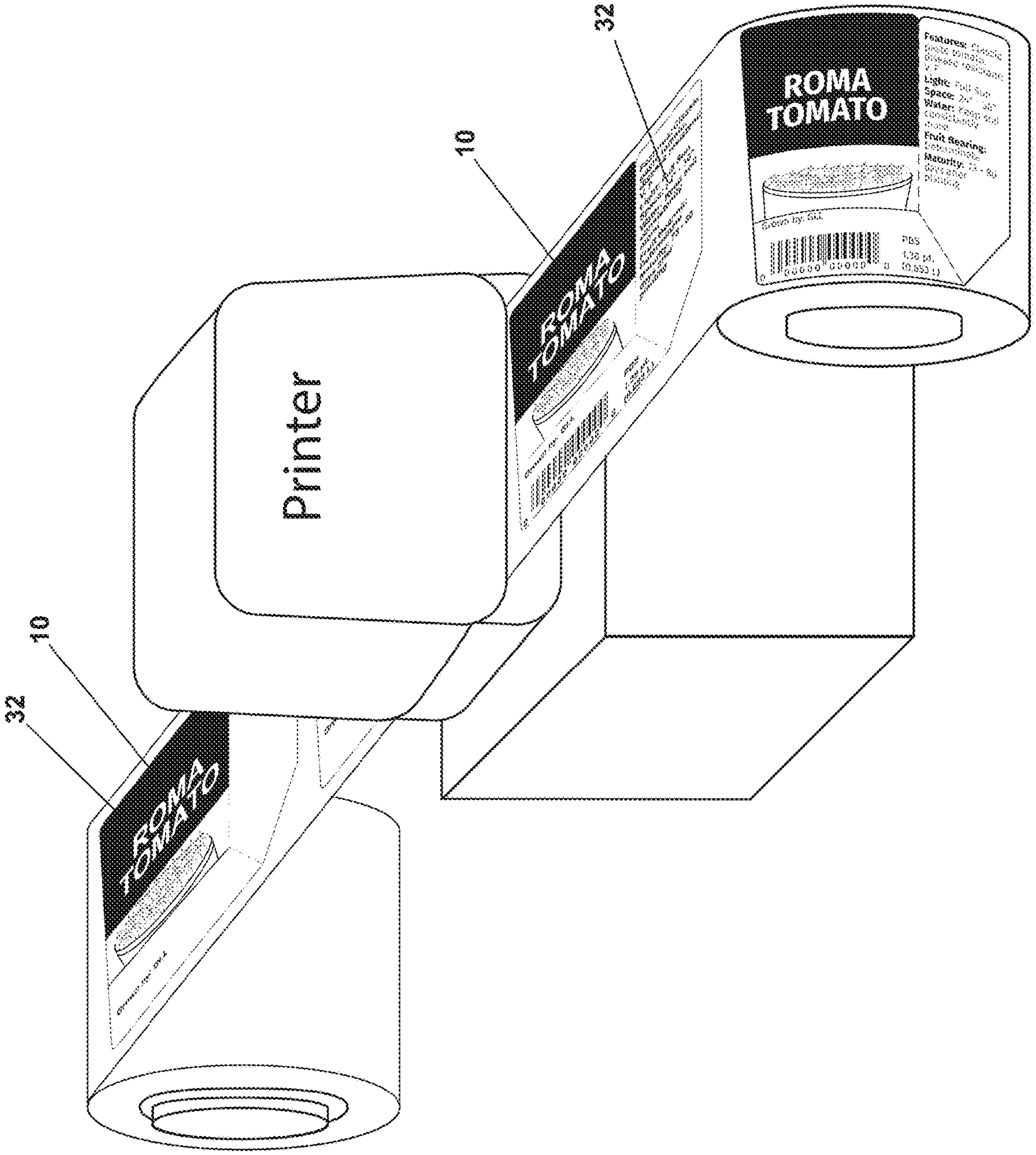
FIG. 6 illustrates use of a printer to print on the roll of partially preprinted horticultural plant labels of FIG. 5B.
Figure 7:
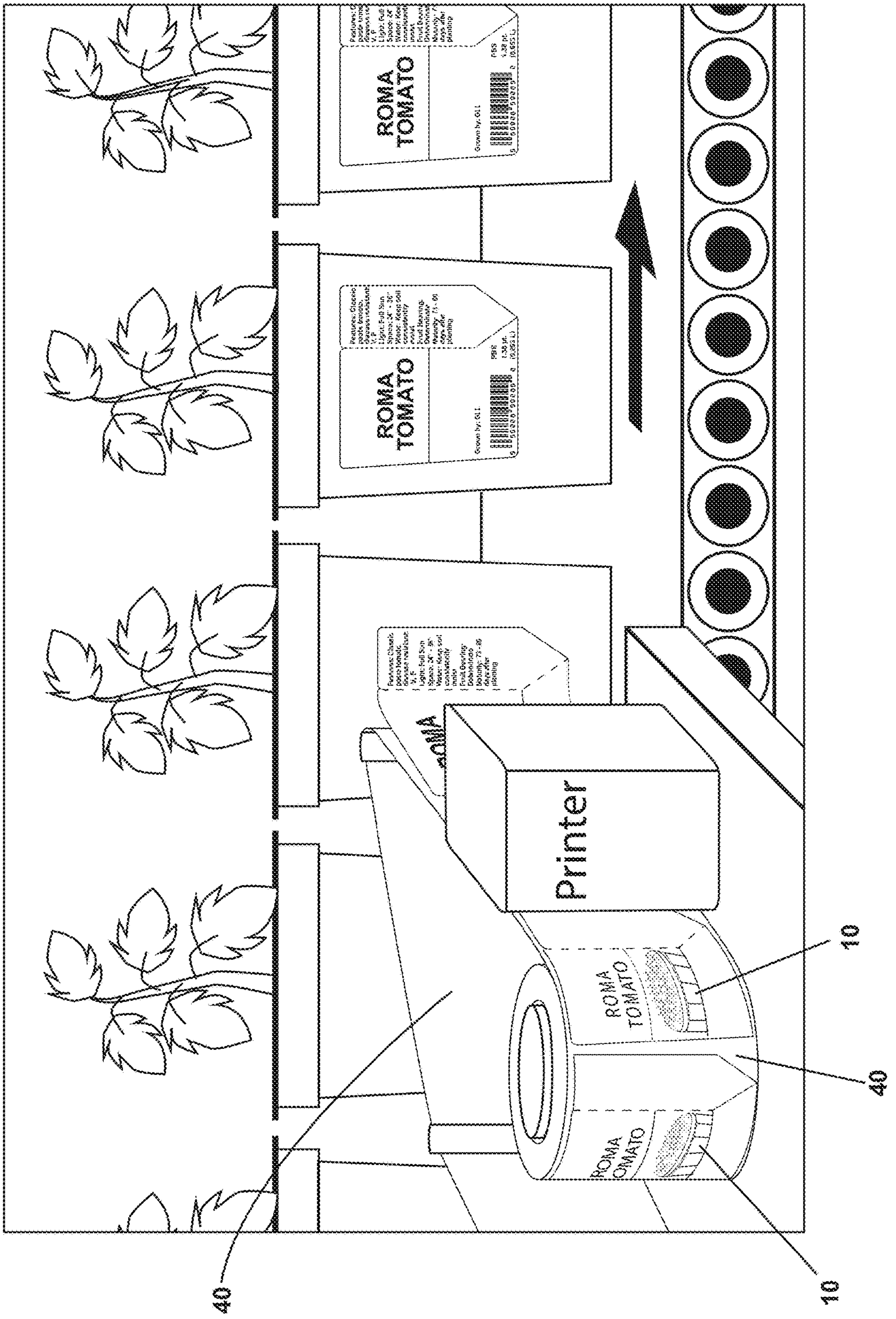
FIG. 7 illustrates use of a printer to print on the roll of partially preprinted horticultural plant labels of FIG. 5B and automatic application of the printed horticultural plant labels to containers.
Figure 8:
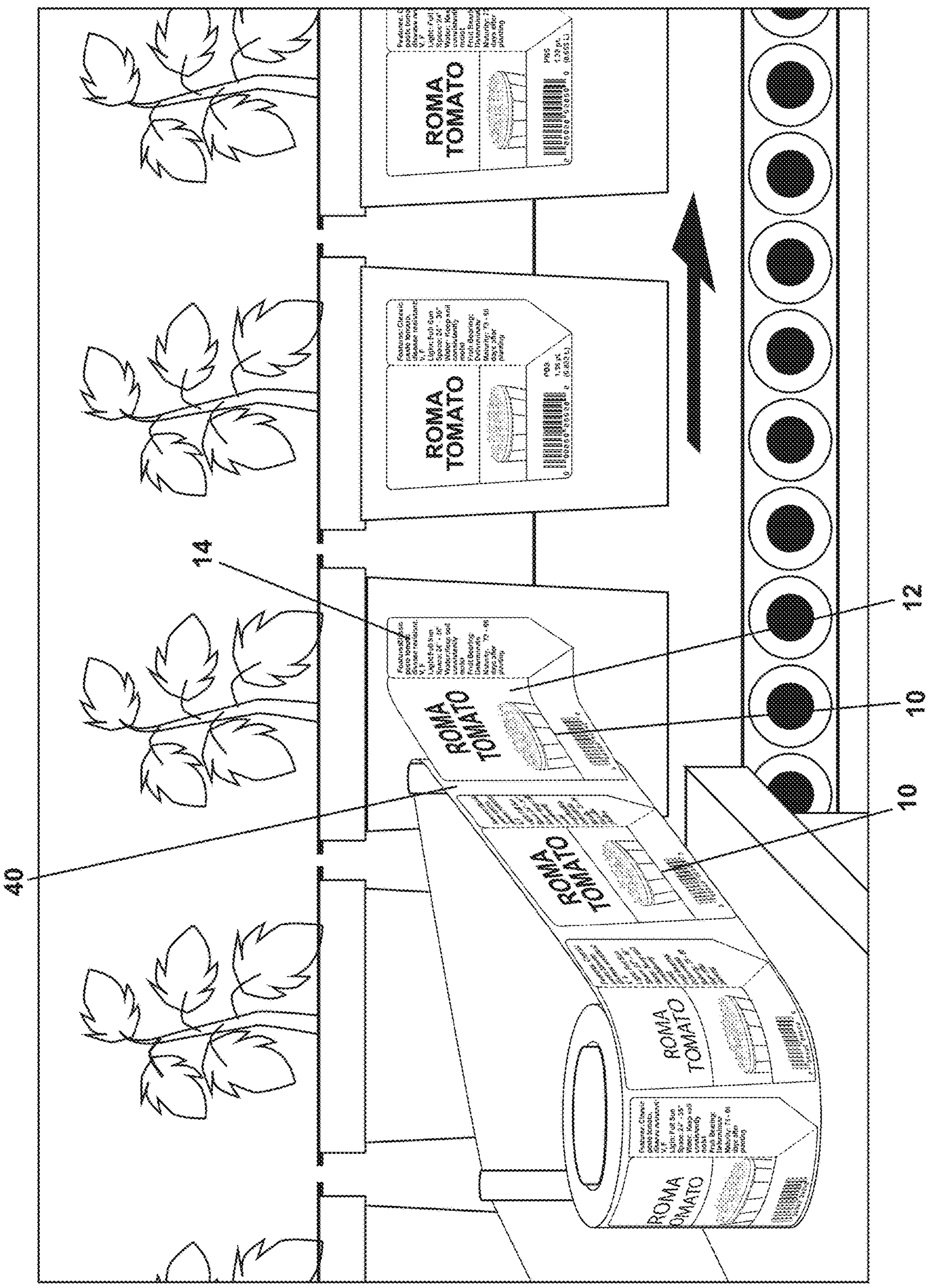
FIG. 8 illustrates application of the fully printed horticultural plant labels of FIG. 5A to containers.
Figure 9:
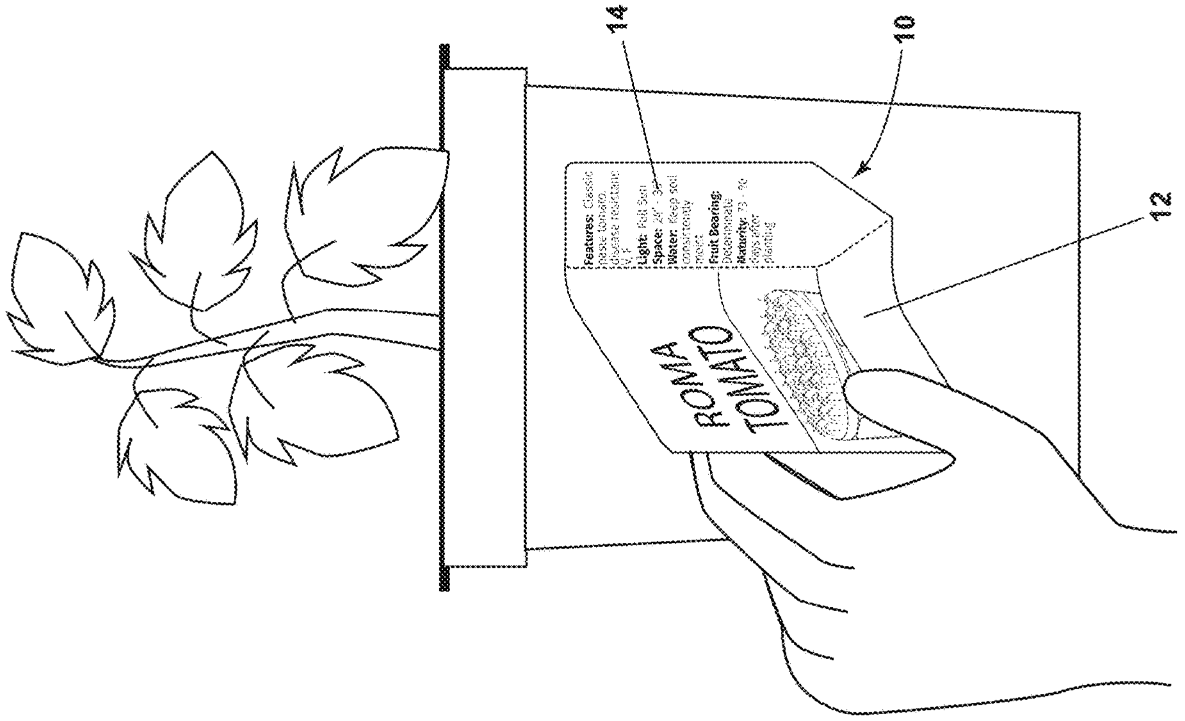
FIG. 9 illustrates manual application of the fully printed horticultural plant labels of FIG. 5A to containers.

FIG. 6 illustrates printing indicia 32 in the fourth step and/or the fifth step [[110]] after a roll of labels 10 has been partially printed and rerolled after the nineth step [[118]]. Such printing may be done by or at the request of a grower with indicia unique to that grower. It will be understood that precut labels 10 with no indicia 32 can be made available for subsequent printing after the nineth step [[118]]. FIG. 7 illustrates printing indicia 32 in the fourth step and/or the fifth step [[110]] combined with the tenth step [[120]]. FIG. 8 illustrates automated application of labels 10 from a sheet of release liner 40 in the tenth step [[120]] with no printing. FIG. 9 illustrates manual application of a label 10 to a container after removal of the label 10 from the sheet in the tenth step [[120]].

Figure 10:
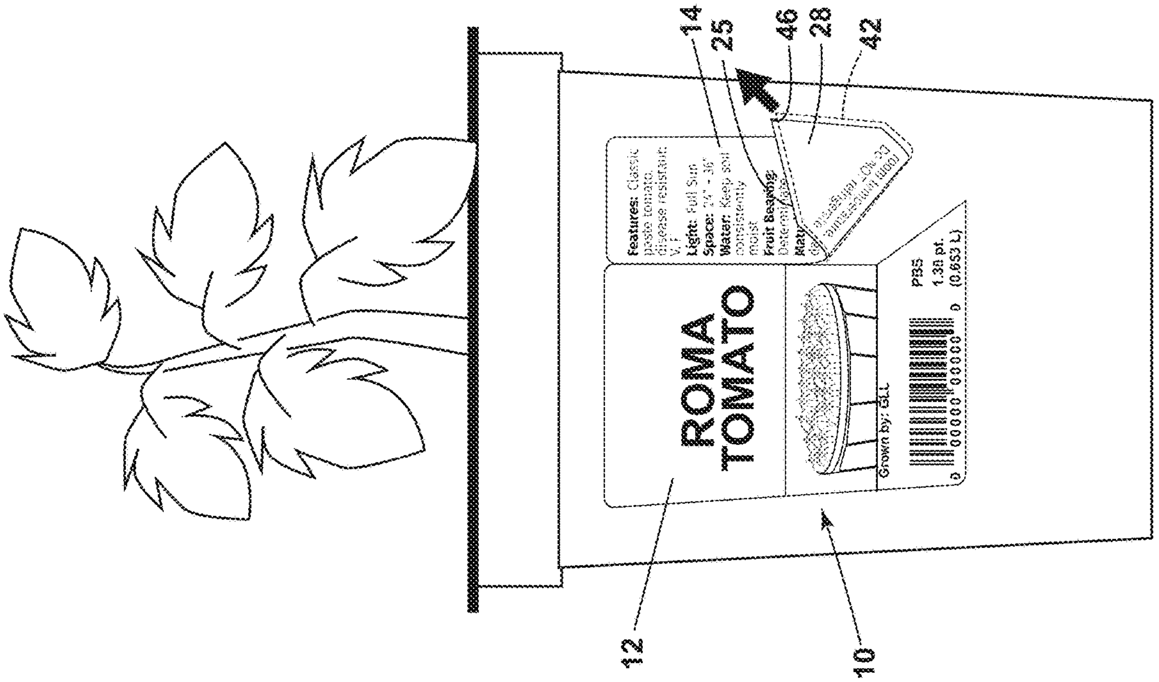
FIG. 10 illustrates detaching the tag portion of the horticultural plant label of FIG. 1A after affixation to a plant container.

A major benefit of the label 10 as disclosed herein can be seen in FIG. 10 where a user, having obtained a container with a growing plant with a label 10 affixed to the container, can remove the tag portion 14 from the container and the label 10. Because the tab 28 is not adhered to the container due to the adhesive deadener 42 coating the adhesive layer 36 beneath the tab, the use can grasp the tip 46 of the tab 28 and pull. The pulling will cause the tag portion 14 to detach from the identifier portion 12 along the scored detach line 26. And because the tag portion 14 is adhered to the container only at the small strip 45, the pulling is enough to overcome the minimal adherence of the small strip 45, causing the tag portion 14 to release from the container.

To the extent not already described, the different features and structures of the various embodiments of the present disclosure may be used in combination with each other as desired. For example, one or more of the features illustrated and/or described with respect to one aspect can be used with or combined with one or more features illustrated and/or described with respect to the other aspects described herein. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A method of making a label for a growing plant, the method comprising:

providing a sheet having a substrate layer, a pressure sensitive permanent adhesive layer on the substrate layer, and a release liner on the permanent adhesive layer;

printing indicia related to a growing plant on the substrate layer to form a printed substrate layer, wherein the printing indicia is on the substrate layer opposite the permanent adhesive layer;

delaminating the release liner from the permanent adhesive layer;

applying an adhesive deadener to a predetermined portion of the permanent adhesive layer;

relaminating the release liner to the permanent adhesive layer;

cutting only the substrate layer to define a label; and scoring the label within the cutting to define an identifier portion and a tag portion;

wherein the predetermined portion is entirely within the tag portion, and the tag portion includes a tab with the adhesive deadener between the permanent adhesive layer and the release liner such that the identifier portion is fixable to a plant container and the tag portion is detachable from the identifier portion at the scoring and from the plant container by way of the tab.

2. The method of claim 1 wherein the printing indicia is on the permanent adhesive layer.

3. The method of claim 1 wherein the printing indicia is on both the permanent adhesive layer and the substrate layer opposite the permanent adhesive layer.

4. The method of claim 1 wherein the detachable portion includes a strip of the permanent adhesive layer without the adhesive deadener away from the tab.

5. The method of claim 1 further comprising rolling the sheet after the cutting and scoring steps.

6. The method of claim 5 comprising unrolling the sheet, delaminating the release liner from the sheet, and applying the label from the sheet to the plant container.

7. The method of claim 1 wherein the substrate layer is polyethylene.

8. The method of claim 1 wherein the permanent adhesive layer is in a range of 4-10 mm thick.

9. A method of making a label for a growing plant, the method comprising:

providing a sheet having a substrate layer, a permanent adhesive layer on the substrate layer, and a release liner on the permanent adhesive layer;

delaminating the release liner from the permanent adhesive layer;

applying an adhesive deadener to a predetermined portion of the permanent adhesive layer;

relaminating the release liner to the permanent adhesive layer;

cutting only the substrate layer to define a label; and scoring the label within the cutting to define an identifier portion and a tag portion;

wherein the predetermined portion is entirely within the tag portion, and the tag portion includes a tab with the adhesive deadener between the permanent adhesive layer and the release liner such that the identifier portion is fixable to a plant container and the tag portion is detachable from the identifier portion at the scoring and from the plant container by way of the tab, and wherein the detachable portion includes a strip of the permanent adhesive layer without the adhesive deadener away from the tab.

10. The method of claim 9 further comprising rolling the sheet after the cutting and scoring steps.

11. The method of claim 10 comprising unrolling the sheet, delaminating the release liner from the sheet, and applying the label from the sheet to the plant container.

12. The method of claim 9 wherein the substrate layer is polyethylene.

13. The method of claim 9 wherein the permanent adhesive layer is in a range of 4-10 mm thick.

14. A method of making a label for a growing plant, the method comprising:

providing a sheet having a substrate layer, a permanent adhesive layer on the substrate layer, and a release liner on the permanent adhesive layer;

delaminating the release liner from the permanent adhesive layer;

applying an adhesive deadener to a predetermined portion of the permanent adhesive layer;

relaminating the release liner to the permanent adhesive layer;

cutting only the substrate layer to define a label;

scoring the label within the cutting to define an identifier portion and a tag portion;

rolling the sheet after the cutting and scoring steps;

unrolling the sheet, delaminating the release liner from the sheet, and applying the label from the sheet to a plant container;

wherein the predetermined portion is entirely within the tag portion, and the tag portion includes a tab with the adhesive deadener between the permanent adhesive layer and the release liner such that the identifier portion is fixable to the plant container and the tag portion is detachable from the identifier portion at the scoring and from the plant container by way of the tab.

15. The method of claim 14 wherein the substrate layer is polyethylene.

16. The method of claim 14 wherein the permanent adhesive layer is in a range of 4-10 mm thick.

* * * * *